United States Patent
Ghaderi (10) Patent No.: US 10,608,560 B2
(45) Date of Patent: Mar. 31, 2020

(54) MOTOR CONTROLLER AND A MOTOR SYSTEM

(71) Applicant: Nidec Corporation, Kyoto (JP)

(72) Inventor: Ahmad Ghaderi, Kyoto (JP)

(73) Assignee: Nidec Corporation, Kyoto (JP)

( * ) Notice: Subject to any disclaimer, the term of this patent is extended or adjusted under 35 U.S.C. 154(b) by 18 days.

(21) Appl. No.: 15/748,208

(22) PCT Filed: Aug. 8, 2015

(86) PCT No.: PCT/JP2015/004002
§ 371 (c)(1),
(2) Date: Jan. 29, 2018

(87) PCT Pub. No.: WO2017/025993
PCT Pub. Date: Feb. 16, 2017

(65) Prior Publication Data
US 2018/0219497 A1  Aug. 2, 2018

(51) Int. Cl.
*H02P 6/10* (2006.01)
*H02P 21/14* (2016.01)
(Continued)

(52) U.S. Cl.
CPC ............. *H02P 6/10* (2013.01); *H02P 21/141* (2013.01); *H02P 21/18* (2016.02); *H02P 21/20* (2016.02); *H02P 21/22* (2016.02); *H02P 21/26* (2016.02)

(58) Field of Classification Search
USPC ........................................................ 318/558
See application file for complete search history.

(56) References Cited

U.S. PATENT DOCUMENTS 6,118,247 A * 9/2000 Obayashi .............. B60L 15/025
318/712
6,304,052 B1  10/2001 O'Meara et al.
(Continued)

FOREIGN PATENT DOCUMENTS

| JP | 2004-129416 A | 4/2004 |
| JP | 2015-111974 A | 6/2015 |
| JP | 2015126598 A * | 7/2015 |

OTHER PUBLICATIONS

Official Communication issued in International Patent Application No. PCT/JP2015/004002, dated Oct. 27, 2015.
(Continued)

*Primary Examiner* — Jorge L Carrasquillo
(74) *Attorney, Agent, or Firm* — Keating & Bennett (57) ABSTRACT

A motor controller includes target current value generating circuitry that generates a d-axis target current value and q-axis target current value, motor current value generating circuitry that generates a d-axis motor current value and a q-axis motor current value of current supplied to a motor, command voltage value generating circuitry that generates a d-axis command voltage value from a difference between the d-axis motor current value and the d-axis target current value and a q-axis command voltage value from a difference between the q-axis motor current value and the q-axis target current value, command voltage value converting circuitry that converts the d-axis command voltage value and the q-axis command voltage value into three-phase command voltage values, and command voltage value modifying circuitry that modifies the three-phase voltage values based on motor flux values and target flux values.

6 Claims, 4 Drawing Sheets

(51) Int. Cl.
*H02P 21/26* (2016.01)
*H02P 21/22* (2016.01)
*H02P 21/20* (2016.01)
*H02P 21/18* (2016.01)

(56) References Cited

U.S. PATENT DOCUMENTS

| | | |
|---|---|---|
| 7,005,822 B1 | 2/2006 | O'Gorman et al. |
| 8,657,585 B2 | 2/2014 | Hong et al. |
| 2004/0007999 A1 | 1/2004 | Kushion et al. |
| 2005/0242767 A1 | 11/2005 | Ho |
| 2008/0007199 A1* | 1/2008 | Kasaoka ............ H02P 21/0089 318/807 |
| 2008/0129243 A1* | 6/2008 | Nashiki ................. H02K 1/145 318/701 |
| 2008/0136380 A1 | 6/2008 | Hoffmann et al. |
| 2009/0058341 A1* | 3/2009 | Lu ...................... H02P 23/0004 318/504 |
| 2012/0007528 A1 | 1/2012 | Nakatsugawa et al. |
| 2012/0303210 A1* | 11/2012 | Matsui ................... B64C 13/40 701/36 |

OTHER PUBLICATIONS

Attaianese et al., "Hardware Dead Time Compensation for VSI Based Electrical Drives", IEEE International Symposium on Industrial Electronics, vol. 2, Feb. 2001, 7 pages.

* cited by examiner

MOTOR CONTROLLER AND A MOTOR SYSTEM

BACKGROUND OF THE INVENTION

1. Field of the Invention

The present invention relates to a motor controller, and more specifically a motor controller using vector control to control an AC (Alternating-Current) motor.

2. Description of the Related Art

Vector control is a suitable control for AC motors including induction motors, synchronous reluctance motors, and synchronous permanent magnet motors. In vector control, the current supplied to a motor is handled as a vector which has a direct axis component and a quadrature axis component. The direct axis component corresponds to a torque component, and the quadrature axis component corresponds to a flux component. Vector control presents a fast dynamic response for an AC motor because of the independent control of torque and flux.

In vector control with PWM (Pulse Width Modulation) switching pattern, dead times, on-state resistance of MOSFETs, rise time in switching, DC bus voltage ripples, and etc. cause a difference between actual and reference (called "command") voltages of the inverter. The difference between actual and reference voltages causes a difference between actual and ideal currents. As a result, torque ripple occurs.

Dead time is provided in PWM switching patterns to avoid a short circuit. In a VSI (Voltage Source Inverter), a short circuit would happen if the both the upper and lower transistors of an inverter leg are switched on. To prevent such a short circuit, a very short time during which both switches are opened is inserted, and this very short time is called "dead time". However, dead time can cause problems such as fundamental voltage loss and output waveform distortion in VSIs. The output waveform distortion creates an error between reference and actual voltages of PWM. On-state resistance of MOSFET is the sum of several effects including the source resistance, the channel resistance, the access resistance, the drain resistances, etc. This effect causes problems such as fundamental voltage loss and output waveform distortion in inverter output. The waveform distortion creates an error between reference and actual voltages of PWM.

C. Attaianese, et al. ("Hardware Dead Time Compensation for VSI Based Electrical Drives", IEEE International Symposium on Industrial Electronics, 2001 (ISIS 2001). Vol. 2, pp. 759-764) discloses compensation for the effect of dead time. The control system which does not use vector control has an additional compensation circuit before the inverter power module.

U.S. patent application publication No. 2004/0007999 A1 discloses an active dead time control. The amount of dead time changes based upon the load condition. In the active dead time control, if the value of the motor load decreases, shorter dead time will be used, while for higher torques and speeds, long dead time is used to reduce the risk of damage to the transistors. To solve the torque ripple problem, another method is suggested in U.S. Pat. No. 7,005,822 B1. In this method, the voltage mismatch between the phases is determined and compensated.

Another method for ripple compensation has been suggested in U.S. Pat. No. 8,657,585 B2. In this method, the ripple of speed is measured and a compensation torque based on this ripple is applied.

However, the approach of C. Attaianese, et al. requires an additional circuit which increases the system cost and complexity. Also, there is a constant time shifts between the modulator signals and VSI signals which leads to new deformation of voltage waveform. As mentioned previously, any waveform deformation can lead to torque ripple.

The method of U.S. patent application publication No. 2004/0007999 A1 only can improve torque control at low motor loads, and is not useful for higher motor load. Also, this method has disadvantages in high motor speeds where a high reference voltage is required.

The method of U.S. Pat. No. 7,005,822 B1 does not have any suggestion for dead time and on-state resistance effect. The method of U.S. Pat. No. 8,657,585 B2 is directed to reducing motor speed ripple and not torque ripple. Therefore, this method only can be applied to speed control drives and not to torque control drives.

SUMMARY OF THE INVENTION

The prior art has not studied about torque ripple caused by dead time, on-state resistance, or the like in vector control. Preferred embodiments of the present invention are able to reduce torque ripple in vector control with a simple configuration.

A motor controller of a preferred embodiment of the present invention includes: target current value generating circuitry that generates a d-axis target current value and a q-axis target current value using at least one of a target rotating speed and a target torque; motor current value generating circuitry that generates a d-axis motor current value and a q-axis motor current value, the d-axis motor current value indicating a d-axis component of current supplied to a motor from an inverter, the q-axis motor current value indicating a q-axis component of the current supplied to the motor from the inverter; command voltage value generating circuitry that generates a d-axis command voltage value and a q-axis command voltage value, the d-axis command voltage value being generated from a difference between the d-axis motor current value and the d-axis target current value, the q-axis command voltage value being generated from a difference between the q-axis motor current value and the q-axis target current value; command voltage value converting circuitry that converts the d-axis command voltage value and the q-axis command voltage value into three-phase command voltage values to be inputted to the inverter; and command voltage value modifying circuitry that modifies the three-phase voltage values indirectly or directly based on motor flux values and target flux values, the motor flux values indicating flux generated in the motor.

Preferred embodiments of the present invention are also directed to a motor system including the motor controller.

Preferred embodiments of the present invention are able to reduce torque ripple with simple constitution in vector control.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
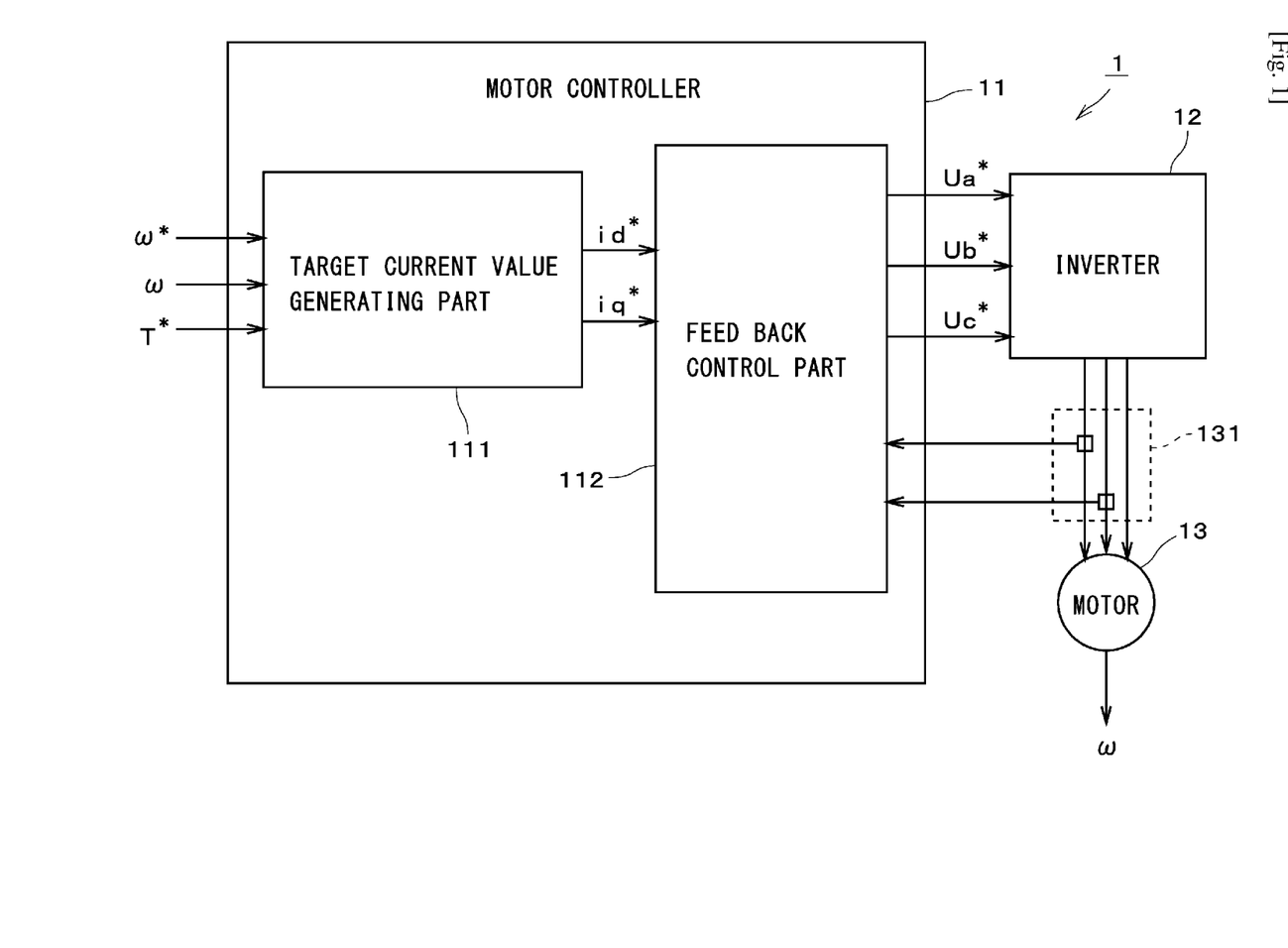
FIG. 1 is a block diagram showing a motor system according to a preferred embodiment of the present invention.

FIG. 1 is a block diagram showing a motor system 1 according to a preferred embodiment of the present invention. The motor system 1 includes a motor controller 11, an inverter 12, and a motor 13. The motor controller 1 controls driving of the motor 13 under vector control. The inverter 12 is preferably a PWM (Pulse Width Modulation) inverter. The inverter 12 is connected to the motor controller 11. The motor 13 is connected to the inverter 12.

The motor controller 11 preferably includes target current value generating circuitry 111 and feedback control circuitry 112. A target rotating speed ω*, a motor rotating speed ω, and a target toque T* are inputted to the target current value generating circuitry 111. Only one of a target rotating speed ω* and a target toque T* may be inputted to the target current value generating circuitry 111. In the following explanation, the word "target" which is attached to a current value, a rotating speed, a toque or the like can be expressed as "reference", for example, a "reference current value". The word "motor", which is attached to a current value, a rotating speed or the like, indicates that the value is acquired by measurement or estimation, and it can be expressed as "actual", for example, an "actual current value". A rotating speed is a rotating speed of the rotating portion of the motor 13.

The target current value generating circuitry 111 generates a d-axis target current value id* and a q-axis target current value iq* using at least one of the target rotating speed ω* and the target torque T*. In the present preferred embodiment, the target current value generating circuitry 111 uses the target rotating speed ω*, rotating speed ω which is measured and the target torque T*. The d-axis target current value id* and the q-axis target current value are inputted to the feedback control circuitry 112. The feedback control circuitry 112 generates three-phase command voltage values Ua*, Ub* and Uc* to be inputted to the inverter 12. The inverter 12 inputs three-phase driving voltages to the motor 13.

A sensor is provided between the inverter 12 and the motor 13. The sensor 131 detects phase currents supplied from the inverter 12 to the motor 13. Two phase currents are detected in FIG. 1, however, three phase currents may be detected.

Figure 2:
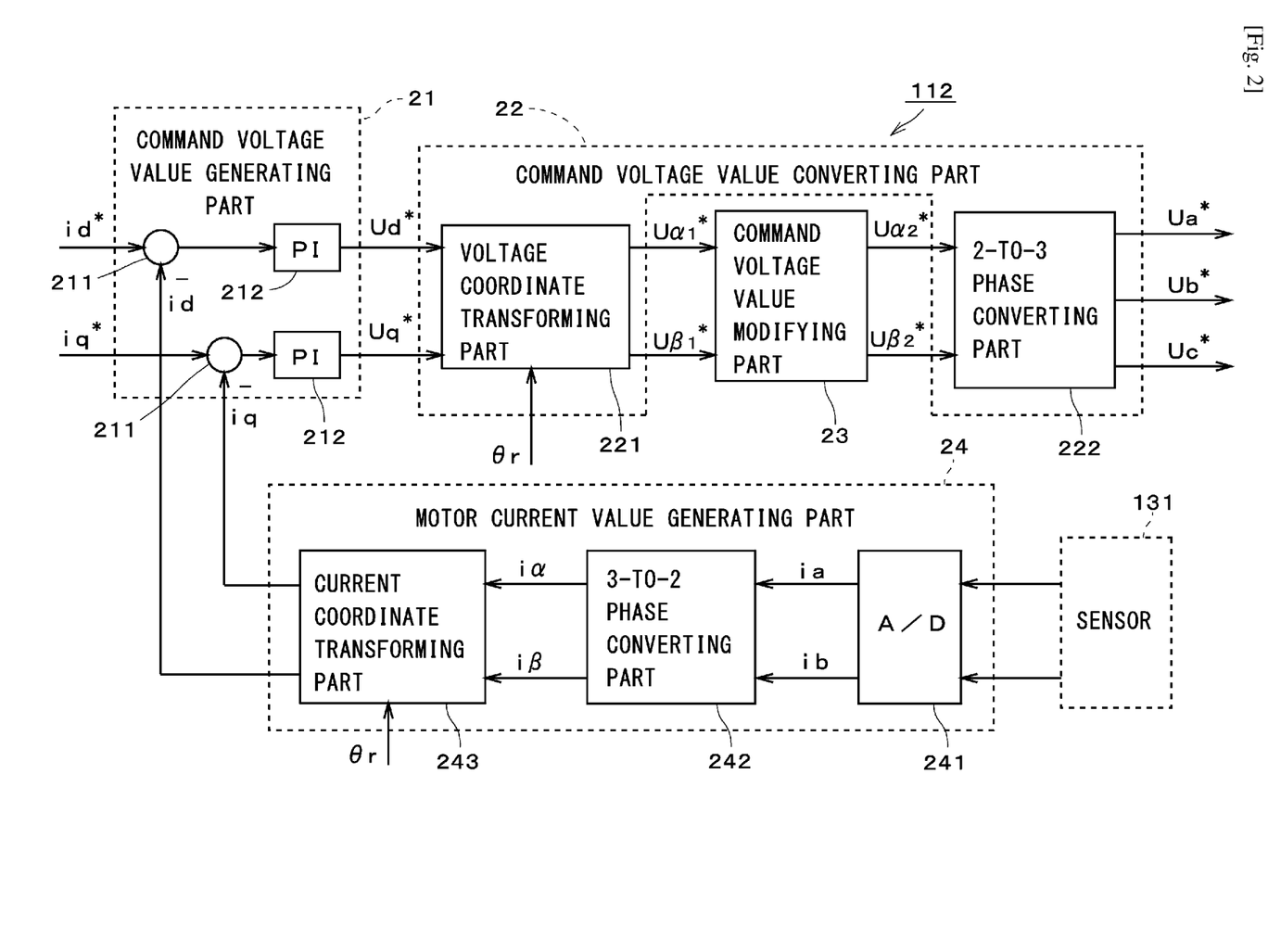
FIG. 2 is a block diagram showing feedback control circuitry according to a preferred embodiment of the present invention.

FIG. 2 is a block diagram showing the feedback control circuitry 112 according to a preferred embodiment of the present invention. The feedback control circuitry 112 includes command voltage value generating circuitry 21, command voltage value converting circuitry 22, command voltage value modifying circuitry 23, and motor current value generating circuitry 24.

The motor current value generating circuitry 24 generates a d-axis motor current value id and a q-axis motor current value iq. The d-axis motor current value id indicates a d-axis component of current supplied to the motor 13 from the inverter 12. The q-axis motor current value iq indicates a q-axis component of the current supplied to the motor 13 from the inverter 12. The d-axis motor current value id and the q-axis motor current value iq are inputted to the command voltage value generating circuitry 21. The d-axis target current value id* and the q-axis target current value are also inputted to the command voltage value generating circuitry 21.

The command voltage value generating circuitry 21 includes two subtractors 211 and two PI operators 212. One of the subtractors 211 obtains a difference between the d-axis motor current value id and the d-axis target current value id*. One of the PI operators 212 generates a d-axis command voltage value Ud* from the difference. The other subtractor 211 obtains a difference between the q-axis motor current value iq and the q-axis target current value iq*. The other PI operator 212 generates a q-axis command voltage value Uq* from the difference.

The command voltage value converting circuitry 22 converts the d-axis command voltage value Ud* and the q-axis command voltage value Uq* into three-phase command voltage values Ua*, Ub*, Uc*. The three-phase command voltage values Ua*, Ub*, Uc* are inputted to the inverter 12. The command voltage value modifying circuitry 23 modifies indirectly the three-phase voltage values Ua*, Ub*, Uc* as will be described later.

The motor current value generating circuitry 24 preferably includes an A/D converter 241, 3-to-2 phase converting circuitry 242, and current coordinate transforming circuitry 243. Magnitudes of two phase currents detected by the sensor 131 are inputted to the A/D converter 241 and converted into phase current values ia, ib representing the magnitudes of the phase currents. The phase current values ia, ib are converted into an α-axis motor current value iα and a β-axis motor current value iβ in the α-β coordinate system the by 3-to-2 phase converting circuitry 242. The 3-to-2 phase converting circuitry 242 generates an α-axis motor current value iα and a β-axis motor current value iβ from signals inputted from the sensor 131.

The current coordinate transforming circuitry 243 converts the α-axis motor current value iα and the β-axis motor current value iβ into a d-axis motor current value id and a q-axis motor current value iq in the d-q coordinate system using a rotating position (or called "rotor angle") θr of the rotating portion of the motor 13.

The command voltage converting circuitry 22 preferably includes voltage coordinate transforming circuitry 221 and 2-to-3 phase converting circuitry 222. The voltage coordinate transforming circuitry 221 converts the d-axis command voltage value Ud* and the q-axis command voltage value Uq* inputted from the command voltage value converting circuitry 21 into an α-axis command voltage value Uα1* and a β-axis command voltage value Uβ1* using the rotating position. The 2-to-3 phase converting circuitry converts modified α-axis command voltage value Uα2* and the β-axis command voltage value Uβ2* into the three-phase command voltage values Ua*, Ub*, Uc*. The three-phase command voltage values Ua*, Ub*, Uc* are inputted to the inverter 12.

As described above, vector control is performed which is feedback control where current flowing in the motor is separated into a d-axis component and a q-axis component in the motor controller 11 and calculation is executed.

The command voltage value modifying circuitry 23 is preferably located between the voltage coordinate transforming circuitry 221 and the 2-to-3 phase converting circuitry 222. The command voltage value modifying circuitry 23 modifies the α-axis command voltage value Uα1* and the β-axis command voltage value Uβ1* inputted from the voltage coordinate transforming circuitry 221 and inputs those values to the 2-to-3 phase converting circuitry 222.

Figure 3:
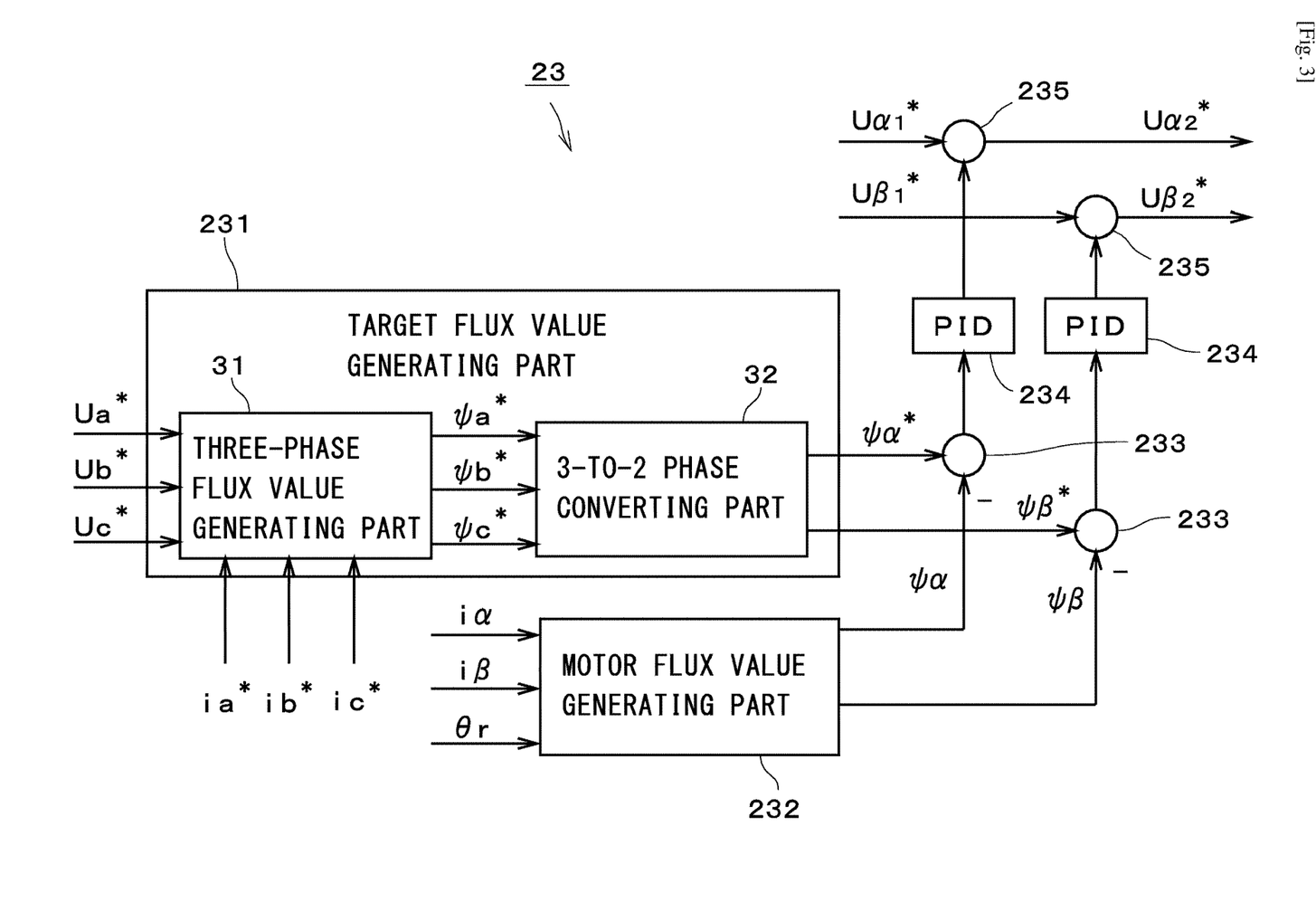
FIG. 3 is a block diagram showing command voltage value modifying circuitry according to a preferred embodiment of the present invention.

FIG. 3 is a block diagram showing the command voltage value modifying circuitry 23 according to a preferred embodiment of the present invention. The command voltage value modifying circuitry 23 preferably includes target flux value generating circuitry 231, motor flux value generating circuitry 232, two subtractors 233, two PID operators 234, and two adders 235. The target flux value generating circuitry 231 includes three-phase flux value generating circuitry 31 and 3-to-2 phase converting circuitry 32.

The motor flux value generating circuitry 232 generates an α-axis motor flux value iψα and a β-axis motor flux value ψβ from the α-axis motor current value iα, the β-axis motor current value iβ, and the rotating position θr. The α-axis motor current value iα and the β-axis motor current value iβ are, for example, generated by the 3-to-2 phase converting circuitry 242 in FIG. 2. Specifically, a table is prepared in advance using a finite element model of the motor 13, the table including combinations of α-axis motor flux values ψα and β-axis motor flux values ψβ respectively corresponding to combinations of α-axis motor current values iα, β-axis motor current values iβ, and rotating positions θr. The model of the motor 13 may preferably be a mathematical model, and in this case, integrators or low pass filters are preferably used, for example. The motor flux value generating circuitry 232 specifies an α-axis motor flux value ψα and a β-axis motor flux value ψβ by referring to the table. The α-axis motor flux value ψα and the β-axis motor flux value ψβ may be obtained using other information.

The target flux value generating circuitry 231 generates an α-axis target flux value ψα* and a β-axis target flux value ψβ*. In the present preferred embodiment, preferably three-phase command voltage values Ua*, Ub*, Uc* and three-phase target current values ia*, ib*, are inputted to the three-phase flux value generating circuitry 31, and the three-phase flux value generating circuitry 31 generates three-phase target flux values ψa*, ψb*, ψc*, for example. It is not shown in the figures that the three-phase target current values ia*, ib*, are generated when the target current value generating circuitry 111 in FIG. 1 generates the d-axis target current value id* and the q-axis target current value iq*. The three-phase command voltage values Ua*, Ub*, Uc* are generated by a 2-to-3 phase converting circuitry which is not shown. The 2-to-3 phase converting circuitry converts the α-axis command voltage value Uα1* and the β-axis command voltage value Uβ1* which are outputted from the voltage coordinate transforming circuitry 221 to the three-phase command voltage values Ua*, Ub*, Uc*.

The 3-to-2 phase converting circuitry 32 converts three-phase target flux values ψa*, ψb*, ψc* into an α-axis target flux value ψα* and a β-axis target flux value ψβ. The α-axis motor flux value ψα and the α-axis target flux value ψα* are inputted to one of the subtractors 233. One of the PID operators 234 generates a compensation value from the difference between them. The compensation value is added to the α-axis command voltage value Uα1* by one of the adders 235. The β-axis motor flux value ψβ and the β-axis target flux value ψβ* are inputted to the other subtractor 233. The other PID operator 234 generates a compensation value from the difference between them. The compensation value is added to the β-axis command voltage value Uβ1* by the other adder 235. By the above operation, the α-axis command voltage value Uα1* and the β-axis command voltage value Uβ1* outputted from the voltage coordinate transforming circuitry 221 are modified to obtain an α-axis command voltage value Uα2* and a β-axis command voltage value Uβ2*.

As described above, the command voltage value modifying circuitry 23 generates an α-axis compensation value (or modification value) for the α-axis command voltage value Uα1* from the α-axis motor flux value ψα and the α-axis target flux value ψα*, and generates a β-axis compensation value (or modification value) for the β-axis command voltage value Uβ1* from the β-axis motor flux value ψβ and the β-axis target flux value ψβ*. The command voltage value modifying circuitry 23 compensates torque ripple in vector control. The motor controller 11 realizes to reduce torque ripple with a simple constitution in vector control.

The motor controller 11 can be easily realized by adding the command voltage value modifying circuitry 23 to a conventional motor controller. The command voltage value modifying circuitry 23 can be easily configured as a processor executing a program stored on a memory. The command voltage value modifying circuitry 23 may also be provided by integrated circuit elements, discrete components, or some combination of integrated circuit elements, discrete components, and/or a processor executing a program stored on a memory.

Flux and torque have a close relationship, therefore, torque ripple is able to be reliably reduced by performing compensation based on flux in the motor controller 11.

Figure 4:
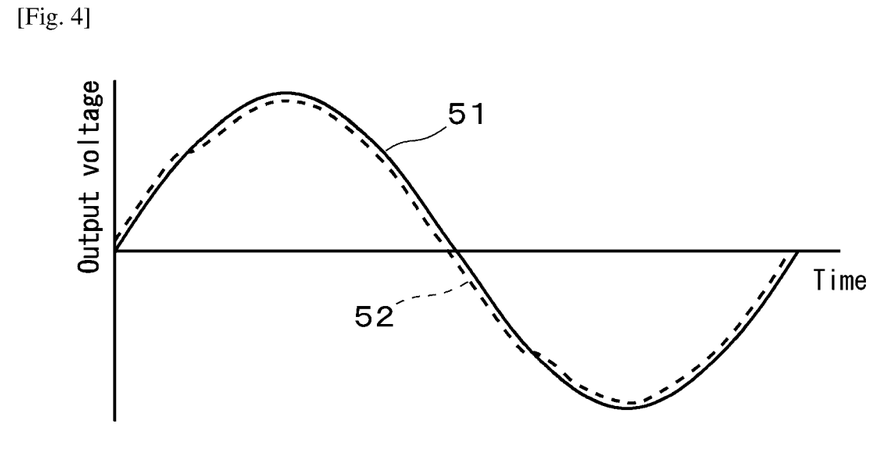
FIG. 4 shows an example of deformation of an output waveform caused by dead time.

As described above, dead time is provided in PWM switching pattern to avoid a short circuit. However, dead time can cause problems such as fundamental voltage loss and output waveform distortion in VSIs. A solid line 51 in FIG. 4 indicates an ideal output waveform in a case where dead time does not exist, and a broken line 52 indicates an actual waveform in a case where dead time exists. As shown in FIG. 4, the output waveform distortion creates an error between reference and actual voltages of PWM. The compensation method described above reduces torque ripple caused by the error between reference and actual voltages.

The validity of the motor controller 11 is evaluated using a model of an SPM (Surface Permanent Magnet) motor. The SPM motor is used in, for example, an EPS (electric power steering system). The performances of the motor are compared with and without modification (compensation) by the command voltage value modifying circuitry 23. These comparisons have been done using the system parameters shown in Table 1.

TABLE 1

| | |
|---|---|
| MOSFET on-state resistance | 1 mΩ |
| Dead time | 1.3 μs |
| Snubber resistance (Resistive snubber) | 10 kΩ |
| AD converter | 10 bits |
| iq* | 15A/40A |
| id* | 0A |
| Speed | 500 rpm |

Table 2 shows the absolute and relative torque ripples of both methods for iq*=15A and iq*=40A, respectively. These results show that for the operation points (iq*=15A, 500 rpm and iq*=40A, 500 rpm), the relative torque ripple of conventional vector control is 40 percent or more higher than the proposed method. Therefore, the proposed method reduces torque ripple considerably.

TABLE 2

| iq* | | Torque ripple (Nm) | Rate |
|---|---|---|---|
| 15A | Compensation | 0.10944 | 100.00 |
| | No compensation | 0.15500 | 141.60 |
| 40A | Compensation | 0.12044 | 100.00 |
| | No compensation | 0.16859 | 140.00 |

Various modifications of the preferred embodiments of the present invention discussed above are possible within the scope of the present invention.

The motor flux value generating circuitry 232 may generate motor flux values by various methods. Note that three-phase motor voltages (active voltages) outputted from the inverter 12 are pulses, and it is difficult to measure them accurately, therefore, it is preferable to use motor current values which are values of actual currents. The motor flux value generating circuitry 232 can be defined by a sensor that measures magnetic fluxes.

The target flux value generating circuitry 231 may also generate target flux values by various other methods. For example, the three-phase target flux values ψa*, ψb*, ψc* can be generated from the three-phase target current values ia*, ib*, and the rotating position θr using a same constitution as the motor flux value generating circuitry 232. The three-phase target flux values ψa*, ψb*, ψc* can be generated from the three-phase command voltage values Ua*, Ub*, Uc* and a load torque of the motor 13. Preferably, the target flux value generating circuitry 231 generates the target flux values using the three-phase command voltage values to make calculation easy.

Various non-linear control methods can be adopted in place of PI control or PID control in feedback control in vector control or feedback control in compensation for wave deformation using flux values.

The motor flux value generating circuitry 232 can use other types of motor current values, such as, for example, three-phase motor current values instead of the α-axis motor current value iα and the β-axis motor current value iβ. In general, the motor flux value generating circuitry 232 generates the motor flux values from values of phase currents supplied to the motor 13 from the inverter 12 and a rotating position (or called "motor angle") of the motor 13.

In the above preferred embodiments of the present invention, the command voltage value modifying circuitry 23 modifies the α-axis command voltage value Uα1* and the β-axis command voltage value Uβ1*, however, other type of command voltage values may be modified if the three-phase command voltage values are substantially modified. For example, the d-axis command voltage value Ud* and the q-axis command voltage value Uq*, or the three-phase command voltage values Ua*, Ub*, Uc* may be modified. In other words, the command voltage value modifying circuitry 23 modifies the three-phase voltage values indirectly or directly based on motor flux values and target flux values, the motor flux values indicating flux generated in the motor 13. Note that torque ripple is most easily reduced by modifying the α-axis command voltage value Uα1* and the β-axis command voltage value Uβ1*.

The motor 13 may be any of various types of AC motors, and it can be a synchronous motor, an asynchronous motor or an IPM (Interior Permanent Magnet) motor. The motor controller 11 can be adopted to various type of traction motors other than EPS.

The configurations of the above-described preferred embodiments and variations may be appropriately combined as long as there are no mutual inconsistencies.

Preferred embodiments of the present invention can be applied to an AC motor controller for various uses.

All of the circuitry of preferred embodiments of the present invention may be implemented by integrated circuit elements, discrete electronic components, or some combination of integrated circuit elements, discrete components, and/or a processor executing a program stored on a memory.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor controller comprising:
   target current value generating circuitry that generates a d-axis target current value and a q-axis target current value using at least one of a target rotating speed and a target torque;
   motor current value generating circuitry that generates a d-axis motor current value and a q-axis motor current value, the d-axis motor current value indicating a d-axis component of current supplied to a motor from an inverter, the q-axis motor current value indicating a q-axis component of the current supplied to the motor from the inverter;
   command voltage value generating circuitry that generates a d-axis command voltage value and a q-axis command voltage value, the d-axis command voltage value being generated from a difference between the d-axis motor current value and the d-axis target current value, the q-axis command voltage value being generated from a difference between the q-axis motor current value and the q-axis target current value;
   command voltage value converting circuitry that converts the d-axis command voltage value and the q-axis command voltage value into three-phase command voltage values to be inputted to the inverter; and
   command voltage value modifying circuitry that modifies the three-phase voltage values indirectly or directly based on a difference between motor flux values and target flux values, the motor flux values indicating flux generated in the motor; wherein
   the command voltage value modifying circuitry includes:
      motor flux value generating circuitry that generates an α-axis motor flux value and a β-axis motor flux value from the α-axis motor current value and the β-axis motor current value; and
      target flux value generating circuitry that generates an α-axis target flux value and a β-axis target flux value;
   the command voltage value modifying circuitry:
      generates an α-axis compensation value for the α-axis command voltage value from a difference between the α-axis motor flux value and the α-axis target flux value;
      modifies the α-axis target flux value; and
      generates a β-axis compensation value for the β-axis command voltage value from a difference between the β-axis motor flux value and the β-axis target flux value by adding the α-axis compensation value to the α-axis command voltage value and adding the β-axis compensation value to the β-axis command voltage value.

2. The motor controller according to claim 1, wherein the command voltage converting circuitry includes:
   voltage coordinate transforming circuitry that converts the d-axis command voltage value and the q-axis command voltage value into the α-axis command voltage value and the β-axis command voltage value; and 2-to-3 phase converting circuitry that converts the α-axis command voltage value and the β-axis command voltage value into the three-phase command voltage values.

3. The motor controller according to claim 2, wherein the motor current value generating circuitry includes:

3-to-2 phase converting circuitry that generates the α-axis motor current value and the β-axis motor current value from signals inputted from a sensor detecting phase currents supplied to the motor from the inverter; and current coordinate transforming circuitry that converts the α-axis motor current value and the β-axis motor current value into the d-axis motor current value and the q-axis motor current value.

4. The motor controller according to claim 1, further comprising motor flux value generating circuitry that generates the motor flux values from values of phase currents supplied to the motor from the inverter and a rotating position of the motor.

5. The motor controller according to claim 1, further comprising target flux value generating circuitry that generates the target flux values using the three-phase command voltage values.

6. A motor system comprising:
the motor controller according to claim 1;
an inverter connected to the motor controller; and
a motor connected to the inverter.

* * * * *